Oct. 9, 1945.    E. P. WILLIAMS    2,386,645
SPEED REGULATING DEVICE
Filed Nov. 24, 1942
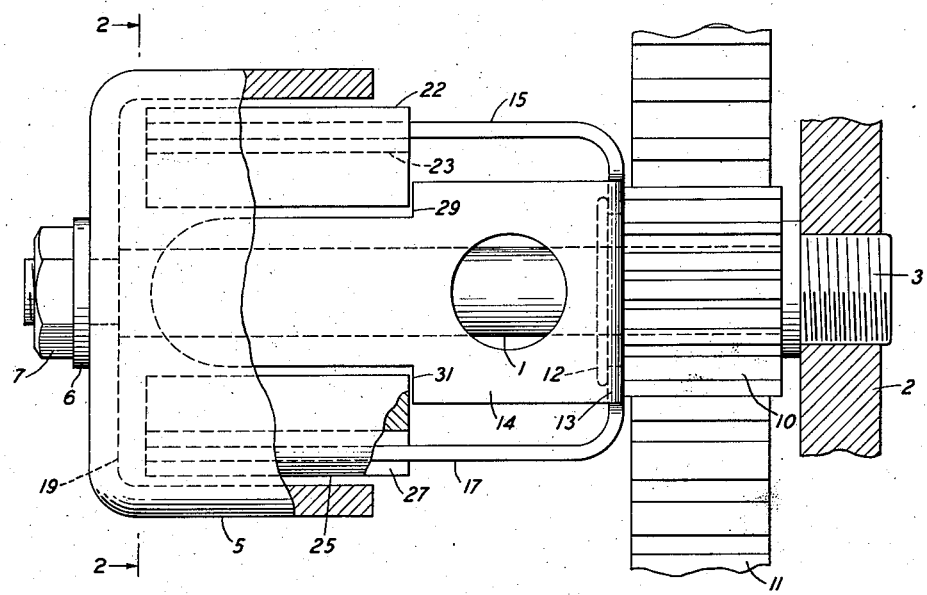
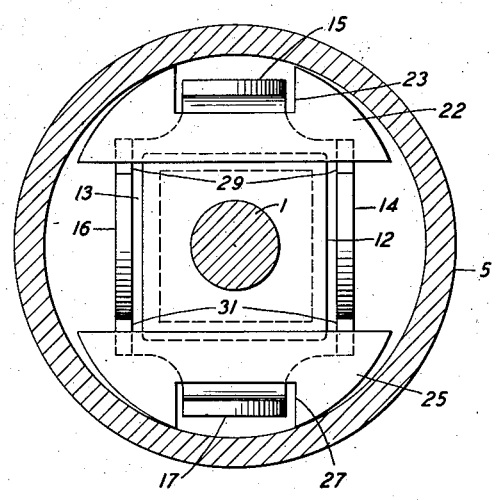
INVENTOR
E. P. WILLIAMS
BY
ATTORNEY

Patented Oct. 9, 1945

2,386,645

UNITED STATES PATENT OFFICE 2,386,645

SPEED REGULATING DEVICE

Ernest P. Williams, Maplewood, N. J., assignor to Bell Telephone Laboratories, Incorporated, New York, N. Y., a corporation of New York Application November 24, 1942, Serial No. 466,822

4 Claims. (Cl. 188—184)

This invention relates to speed regulating devices and particularly to a governor of the loaded weight type.

Objects of the invention are to simplify and reduce the cost of manufacturing devices of this type and to make them more reliable in service.

Heretofore, speed regulating devices have been used in which a rotary member is provided with loaded weights attached thereto which were adapted to swing outwardly in response to centrifugal forces to operate on a stationary friction drum to regulate the speed of said rotary member.

The present invention relates to such devices and a feature thereof is an arrangement in which the weighted members are not attached directly to the rotary driving member but are instead loosely held in a cage member attached to the rotary member and a friction drum is so located as to be frictionally engaged by said members when subjected to centrifugal forces imparted thereto by the rotation of said cage and driving member.

The invention has been illustrated in the accompanying drawing in which

Fig. 1 shows an embodiment of the invention in a governor driven by a gear wheel.

Fig. 2 is a cross section taken on line 2—2 of Fig. 1.

Referring to the drawing, the speed regulating mechanism may include a shaft 1 fixedly secured to a supporting frame member 2 at 3. To the opposite end of this shaft 1 is secured a friction drum 5 by means of a washer 6 and nut 7 on the shaft 2. Rotatably mounted on shaft 1 is a gear pinion 10 driven by a gear 11. To this pinion 10 is riveted at 12 a cage member consisting of a central flat portion 13 and four members bent at right angles from the central portion 13 to form a rectangular box or cage, these members are numbered 14, 15, 16 and 17. These members extend almost to the inside bottom surface of the friction drum 5 as shown at 19. Between the member 15 on one hand and the members 14 and 16 on the other hand is mounted a weighted member 22 having a recessed portion 23 through which the free end of cage member 15 extends. While between member 17 on the one hand and the members 14 and 16 on the other hand a similar weighted member 25 is mounted and provided with a recessed portion 27 through which the member 17 extends. These members are maintained in their positions inside the friction drum 5 by having the members 14 and 16 recessed as shown at points 29 for member 22 and having the members 14 and 16 recessed as shown at the points 31 for member 25 which prevents these members from shifting toward the right looking at Fig. 1, while they are prevented from shifting towards the left by the bottom surface 19 of the friction drum 5 after this drum has been put in place. The outer surfaces of the members 22 and 25 are semi-circular of a somewhat shorter diameter than the inside diameter of the friction drum. The members 22 and 25 are therefore, due to the division of the outer surface thereof in two portions, arranged to engage the friction drum at two widely separated points. The purpose of this is to guard against these members sticking or binding on the friction drum while rotating. When the cage members and gear pinion 10 are rotated by the gear 11, centrifugal forces will therefore cause the members 22 and 25 to be forced outwardly against the inner surface of the friction drum 5 and thus regulate the speed of the driving gear while they are held in the cage formed by the members 14 to 17. Applicant has therefore produced a simple and readily assembled speed regulating mechanism requiring no flexible springs and which depends on the weight of the floating members alone for accurately regulating the speed, and not as in the prior art on weights as well as tension of holding springs for the weights.

Applicant's invention, however, is not confined to the particular disclosure shown but may readily be applied to other forms of cage and weight structures without departing from the spirit of the invention.

What is claimed is:

1. A governor comprising a rotatable member, a stationary drum, two weights inside said drum having outside surfaces conforming approximately with the inside surface of the drum, a bracket secured to said member and having four arms extending inside said drum to form approximately a square enclosing said weights, two of said arms engaging outside opposite depressions in said two weights and the other two arms located between the two weights so that said weights are loosely held with the curved surfaces facing the inside surface of the drum to frictionally engage said surface under the influence of centrifugal force acting on said weights when said member and bracket are rotated to regulate the speed of said member.

2. A governor comprising a rotatable member, a stationary friction drum, two weights inside said drum each having a central longitudinally located groove dividing the outer surface thereof in two separate friction surfaces and a bracket secured to the rotatable member and having two arms each fitting loosely in the longitudinal groove of a corresponding weight, and having two other arms separating the two weights from each other by being located between them so as to loosely hold the two weights approximately in parallel relation to each other and prevent them from upending while they are rotating around the inner surface of the drum and cause them to engage said inner surface each with its two separate friction surfaces.

3. A governor comprising a stationary shaft, a pinion mounted for rotation on one end of said shaft, a stationary friction drum mounted at the opposite end of said shaft, a bracket mounted on said pinion having four arms extending into said drum, two weights mounted and loosely held between said arms in diametrically opposite positions inside said drum so that they are free to engage with their outer surfaces the inner friction surface of the drum under the influence of centrifugal forces when rotated by said pinion and bracket and so shaped and located between said arms that each weight will engage the drum at two separate portions of their respective outer surfaces, one of the arms of the bracket extending between said portions on each weight but detached therefrom and the other two arms extending between the two weights but detached therefrom, said arms serving to loosely guide said weights during their rotation.

4. A governor comprising a driving member, a friction drum having a single inside circular circumferential friction surface, two weights inside said drum each having an indentation in the center to form two independent friction surfaces, and a bracket secured to the driving member having four arms, two arms located to separate the weights and cause them to face with their respective friction surfaces said friction surface of the drum and each of the two other arms located in the indentation of the corresponding weights to cause the weights to be driven by said last-mentioned two arms when the bracket is rotated but be free to engage with their respective friction surfaces at balanced pressures under the influence of centrifugal force said friction surface of the drum to regulate the speed of rotation of the driving member accordingly.

ERNEST P. WILLIAMS.